(12) United States Patent
O'Callaghan et al.

(10) Patent No.: US 6,256,318 B1
(45) Date of Patent: Jul. 3, 2001

(54) NETWORK HUB ACTIVITY DISPLAY

(75) Inventors: Pauric O'Callaghan, Killybegs (IE); Nigel Horspool, Tervuren (BE); David Law, Kempston (GB); Justin Drummond-Murray, Chorleywood (GB); Nicholas Stapleton, Uxbridge (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/140,019

(22) Filed: Aug. 26, 1998

(30) Foreign Application Priority Data

Aug. 29, 1997 (GB) .................................................. 9718411

(51) Int. Cl.⁷ .................................................. H04L 12/413
(52) U.S. Cl. .................................................. 370/447; 370/459
(58) Field of Search .................................. 370/286, 315, 370/338, 445, 492, 447, 252, 459; 340/147

(56) References Cited

U.S. PATENT DOCUMENTS

| | | |
|---|---|---|
| 3,685,035 * | 8/1972 | McClain et al. ...................... 340/253 |
| 4,890,102 | 12/1989 | Oliver . |
| 5,081,627 | 1/1992 | Yu . |
| 5,903,553 * | 5/1999 | Sakamoto et al. ..................... 370/338 |

FOREIGN PATENT DOCUMENTS

| | | |
|---|---|---|
| 0489990 A1 | 6/1992 | (EP) . |
| 0578485 A2 | 1/1994 | (EP) . |
| 0706276 A1 | 4/1996 | (EP) . |
| WO 96/15605 A1 | 5/1996 | (WO) . |

OTHER PUBLICATIONS

European Search And Examination Report For Application GB9818657.0.

* cited by examiner

*Primary Examiner*—Huy D. Vu
*Assistant Examiner*—Alexander Boakye
(74) *Attorney, Agent, or Firm*—McDonnell Boehnen Hulbert & Berghoff

(57) ABSTRACT

The occurrence of collision and activity in a computer network is indicated by activation of a visual indication device. The device is activated for periods which are longer than the actual periods of collision and activity to permit the human eye to register the visual indications. This is particularly useful for high speed networks where the periods of collision and activity may be very brief.

27 Claims, 4 Drawing Sheets

NETWORK HUB ACTIVITY DISPLAY

BACKGROUND OF THE INVENTION

1. Field of the Invention

The present invention relates to communication networks such as local area networks for computers and in particular to hubs within such networks through which the communication traffic passes.

2. The Prior Art

As is well-known in local area networks, computers may be connected to each other to enable them to communicate by way of a hub. The simplest form of communications hub is what is known as a repeater. A repeater typically has a number of ports, to each of which a computer may be connected via an appropriate cable. Any communications sent by a computer would therefore be received by the repeater The repeater simply retransmits any communication received on any port to all of the other ports, thereby enabling the communication to be received by all the other computers connected to the repeater. This is the very simplest form of network and it is possible to extend the network by connecting two, or possibly more, repeaters together via their ports and other networking hubs and equipment can be connected together to form a network in well-known ways. A full description of this is not necessary for understanding the present invention and therefore will not be given here.

Communications take place on such a network according to particular protocols, and one type of protocol is a collision detect multiple access (CDNIA) protocol, of which Ethernet is a well-known example. In such protocols, whenever a communications source such as a computer has a communications packet it wishes to transmit it simply starts to transmit it to the network. In the event that there are no other communications occurring at the time, the communications packet simply passes successfully across the network to the desired destination. If however, another communications packet is being transmitted to the network at the same time then a collision occurs which is detected by both or all transmitting sources and it is determined that the packet has not been sent successfully. After appropriate time another attempt is made to transmit the packet. Such systems work relatively well if properly designed so that there is sufficient network band width to transmit all of the desired communications and, although some collisions are inevitable, if the number of collisions is kept at a relatively low level then the overall communication system is relatively efficient.

To assist in the monitoring of the usage of a network by a network user or manager, it is known to provide a visual indication on a communication hub such as a repeater of the amount of network activity which is occurring and the number of collisions which take place.

For example, it has been known to provide a repeater with an LED indicator which can be activated to be either green or yellow. While there is no activity on the network the indicator is kept switched off. When there is activity on the network the indicator is activated to be green, and when a collision occurs the indicator is activated to be yellow. Such an arrangement has been found to work relatively well in a repeater operating in a network in which communications occur at a speed of 10 megabits a second (10 MB). In such an arrangement if the indicator is simply activated green or yellow during the times when activity and collision respectively are occurring a fairly reasonable visual indication of the usage of the network is given. That is, as network activity increases the indicator is on for an increasing proportion of the time and, as the number of collisions increases, the proportion of the on time for which the indicator is yellow increases.

More recently there have been defined standards of communication in computer networks which permit communications to occur at high speeds, and in particular computer networks operating at 100 MB are now in operation. In such a system, if a visual indicator of the type outlined above is used and it is attempted simply to activate a two colour indicator as outlined above during the times when activity and collision is occurring, then a useful visual output is no longer obtained. This is due to the increased communication speed which has the effect that periods of activity and collision last for much shorter periods of time so that the response times of the indicator and the human eye are not capable of interpreting the output sensibly. For instance, if many collisions were occurring on such a network but all separated in time then it may be that the indicator would never be perceived as indicating yellow but in fact the number of collisions may be dangerously high. Such problems in providing a visual display will simply be compounded by any future increases in network communication speed.

SUMMARY OF THE INVENTION

The present invention provides a method of providing a visual indication of the occurrence of activity and collision in a computer network, the method comprising:

sensing the occurrence of activity in said network;

sensing the occurrence of collision in said network;

providing a first visual indication for at least a predetermined proportion of time when the occurrence of collision is sensed; and providing a second visual indication at least during the occurrence of activity when said first indication is not being provided.

The invention also provides network status indication apparatus comprising:

first sensing means arranged to sense collision in a network;

second sensing means arranged to sense activity in said network;

visual indication means arranged to provide a first visual indication for at least a predetermined proportion of time when said first sensing means senses collision in said network and to provide a second visual indication at least when said second sensing means senses activity in said network and said first visual indication is not being provided.

Preferably, the activity indication is continued until a predetermined time even if the activity on the network ceases before then, or there may be a minimum time for which the activity indicator is given.

According to this invention the visual indication of collision and preferably that of activity in the network are lengthened in time so as to enable the visual display system and the human eye to register the indication which is given.

If the invention is implemented using a ingle dual colour LED indicator as in the prior art outlined above, then it may be that the collision indication overrides the activity indication for the period which the collision indication is to be given.

In one preferred arrangement time is divided into periods of a predetermined length, each period being further divided into a number of sub-periods. The indicating method is implemented such that if any collision occurs during a period a collision indication is given throughout the first sub-period of the following period. If any activity indication is given during any sub-period, then the visual indication of activity is extended to the end of that sub-period. The activity indication may also be given throughout the first sub-period of any period following a period in which activity occurred.

BRIEF DESCRIPTION OF THE DRAWINGS

The present invention will be better understood from the following description of a preferred embodiment given in conjunction with the accompanying drawings in which.

DETAILED DESCRIPTION OF THE DRAWINGS

According to the invention the occurrence of collision and activity in a computer network is indicated by activation of a visual indication device. The device is activated for periods which are longer than the actual periods of collision and activity to permit the human eye to register the visual indications. This is particularly usefull for high speed networks where the periods of collision and activity may be very brief.

The method according to the preferred embodiment of the invention which is described in the following is particularly suitable for implementation in 100 MB networks but it is envisaged that it will continue to be applicable as network speeds increase and additionally may be implemented in conjunction with lower speed networks if this is desired. The preferred method is implemented within a communications hub, such as a repeater.

Figure 1:
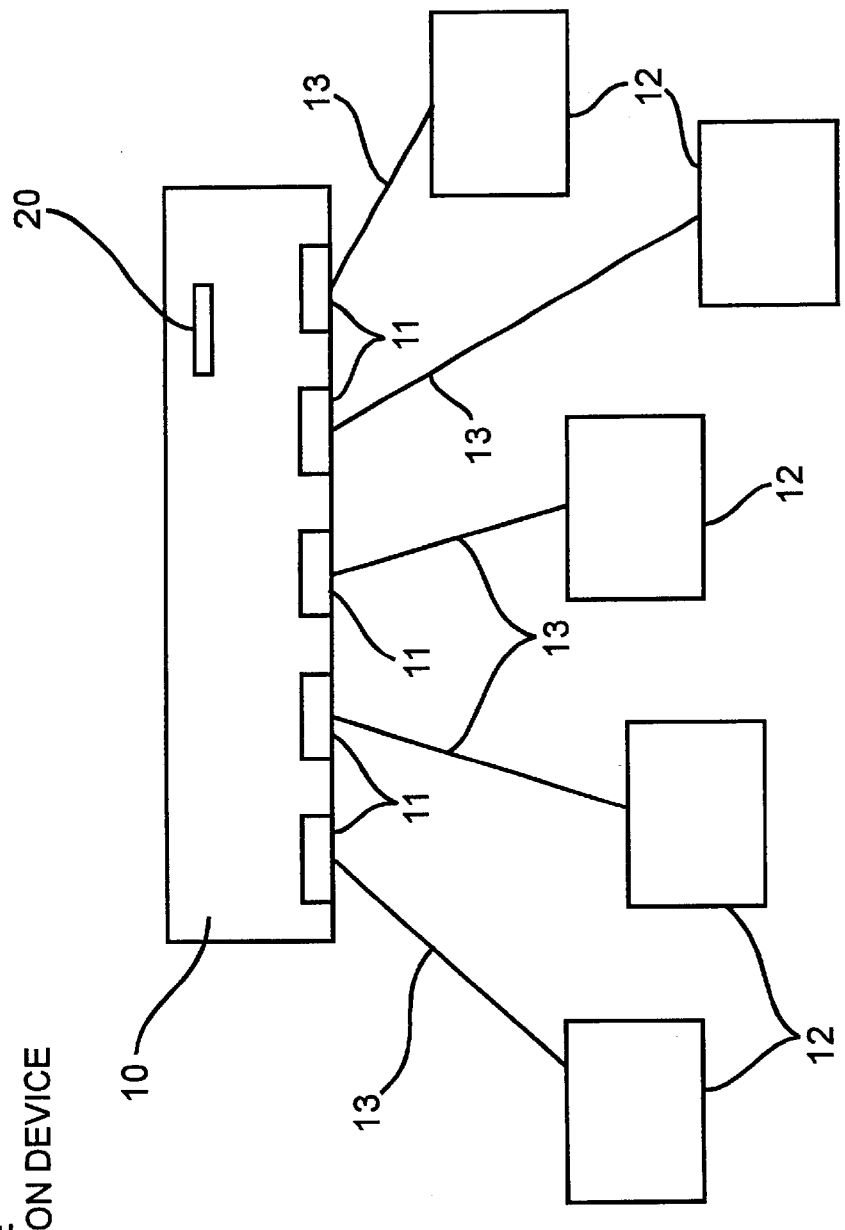
FIG. 1 is a schematic illustration of a network in which the invention is implemented.

FIG. 1 is a schematic diagram illustrating a typical computer network configuration in which the present invention is implemented. In particular, there are provided a plurality, in the illustrated case five, of network devices 12. These are interconnected by way of a communications hub 10 which is provided with a plurality of communications ports 11. Each network device 12 is connected, via suitable cable 13, to a corresponding port 11. In the preferred embodiment, communications hub 10 is a repeater and this means that it simply retransmits any communication received on any one of its ports 11 to all of the other of its ports 11 such that all communications are received by all of the network devices 12. As a result, collisions may occur between communications sent by any two of network devices 12 and repeater 10 causes there to be a single "collision domain" in which all of network devices 12 operate.

Communications hub 10 is provided with a visual indication device 20, for instance in the form of an LED indicator, which is operated as outlined above and as discussed in more detail below to give an indication of the activity and collision status on the network. In particular, it is indicative of the activity and collision status of the collision domain set up by repeater device 10.

Other known types of communications hub include bridges and switches which include some amount of intelligence such that, at least to some extent, communications are only retransmitted on the port or ports necessary for them to reach their intended destination or destinations. Such devices may therefore be considered to define boundaries between different collision domains and, in such circumstances, it may be the case that a plurality of visual indication devices 20 are provided to indicate the activity and collision status on a corresponding plurality of collision domains. Each one would operate according to the description given in the following and therefore the following description will be simply in terms of a repeater operating a single collision domain.

In particular the invention is described firstly in the context of a repeater 10 which has an indicator 20 which may be activated to be either green or yellow to give a visual indication of the status of the network. Indicator 20 may comprise two LED devices, one green and one yellow, or may be formed by any other suitable visual indication device such that the indicator may be activated with either colour. Also, although the embodiment of the invention will be described in relation to a green/yellow indicator, these particular colours are irrelevant to the actual operation of the method but are used for convenience of description as they correspond to the previously used arrangement.

Figure 2:
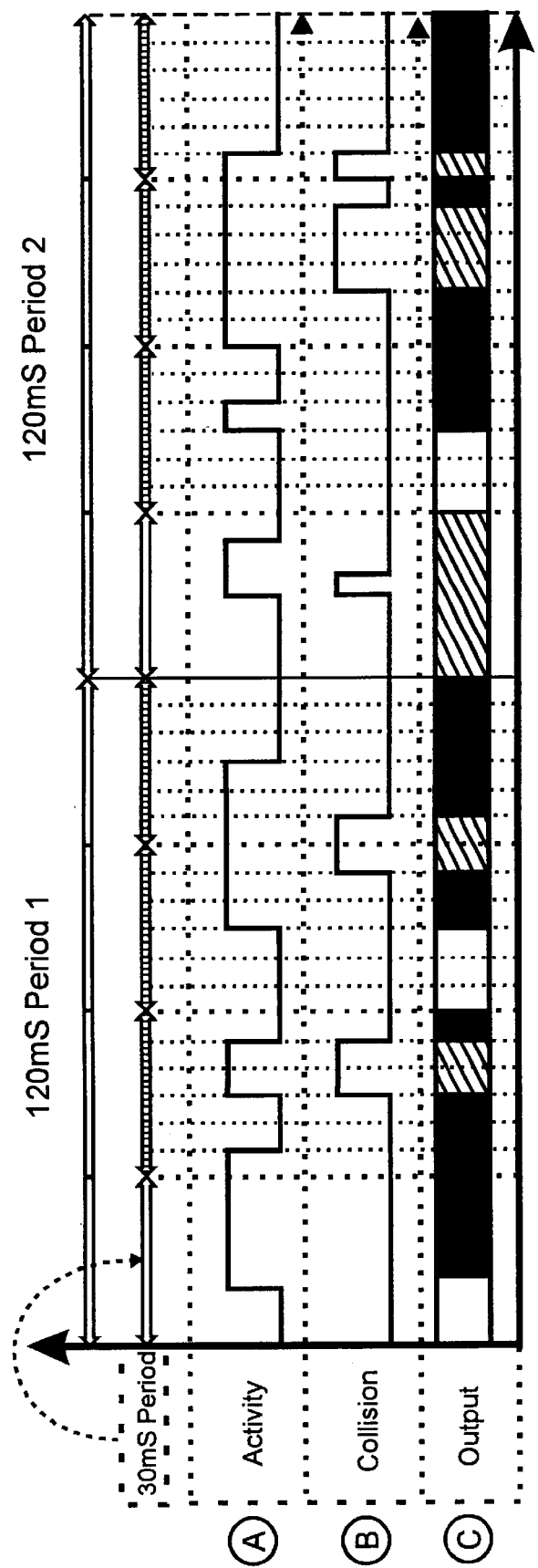
FIG. 2 is a timing diagram illustrating the operation of the preferred embodiment.

FIG. 2 is a timing diagram illustrating the typical operation of a network and the corresponding operation of one preferred embodiment of the invention. In particular, FIG. 2a illustrates the activity on the network of FIG. 1 to which the communications hub 10 is attached, with time. FIG. 2b illustrates the occurrence of collisions on the network, and FIG. 2c illustrates the visual display output given by green/yellow indicator 20 on the communications hub 10 as will be explained in more detail below.

In the preferred embodiment of the present invention and simply for the purposes for monitoring and displaying activity and collisions, time is considered divided into sequential time periods in this case of 120 ms. FIG. 2 illustrates the passage of two such periods. It will be seen that, in the two periods illustrated in FIG. 2 some activity and collisions occur. Broadly, in this illustration activity occurs for approximately 50% of the time and collisions occur for a smaller proportion of the time, as of course collisions can only occur when there is activity.

FIG. 2c illustrates the visual output of the green/yellow indicator in the following way. In the times when, the indicator 20 is activated to be green this is represented by the shading in FIG. 2c, while in the periods where the indicator 20 is activated to be yellow, this is illustrated by the hatched portions in FIG. 2c.

For the purpose of indicating collisions and activity on the network the periods mentioned above are considered further divided into sub-periods. 30 ms is chosen for the sub-periods in the present embodiment as this is considered to be a time period within which the human eye will register a visual indication.

The method operates as follows to indicate activity on the network. Whenever activity is detected the green/yellow indicator 20 is activated to be green. This activation is continued until the end of the sub-period in which the activity occurred, even if the activity ceases before the end of the sub-period. This can perhaps most easily be seen in the fourth sub-period of period 1 and the second sub-period of period 2 in FIG. 2. It can be seen that the activity ceases before the end of the respective sub-period, but the output is continued to be green until the end of the sub-period. In general then the green indication will be given for longer than there is actually activity on the network giving the human eye a good visually detectable indication that activity is occurring on the network.

With regard to the indication of collisions on the network, the indicator 20 is firstly activated to be yellow whenever a collision is occurring. This can be seen in the two occurrences of a collision in period 1 in FIG. 2. It can be seen from this portion of FIG. 2 that the yellow indication ceases at the same time as the collision ceases and in both cases in the illustrated operation, the output, device continues to be activated green in accordance with the above discussed operation of the activity display. Additionally, in the indication of collisions on the network it is the case that the output indicator 20 is activated to be yellow for the whole of the first sub-period of any given period if collision occurred any time during the preceding period. This can be seen in the first sub-period of period 2 in FIG. 2 where the indicator is activated to be yellow for the whole of this sub-period because of the occurrence of at least one collision during period 1. Even though there is some activity during the first sub-period of period 2, this is not associated with a green activation of the output because the yellow display of the collision during the previous period takes precedence.

The operation of the method as described above means that, when there are any collisions occurring, the output device is activated yellow for at least a pre-determined proportion of the time, in the described embodiment one quarter of the time, by the yellow activation during the whole of the first sub-period. As collisions increase in frequency, the proportion of the time for which the output is activated yellow during the second, third and fourth sub-period will also increase giving an indication of the increasing number of collisions However, the fact that there is a minimum proportion of the time for which the output will be activated yellow if there are any collisions at all means that some visually detectable indication of collisions will be given.

In addition, the stretching of the green output indicating activity means that some visually detectable green output will be given even during times of very low activity so that an indication that some activity is occurring is given.

This implementation means that a visually useful output is given from a display on a communications hub even in a fast network operating at 100 MB or above. The output, while not being strictly in proportion to the activity and collision situation does give some useful quantitative indication of the status of the collision domain.

The embodiment in the invention has been described above in terms of a single indicator 20 which can be activated to be either one of two colours, but it will be appreciated that other visual displays could equally be activated according to the timings of the method of the present invention. Further, two different colour devices such as LEDs could be used to form visual indicator 20, and in an arrangement where there are independently controllable visual devices a father modification is possible as described in the following.

Figure 3:
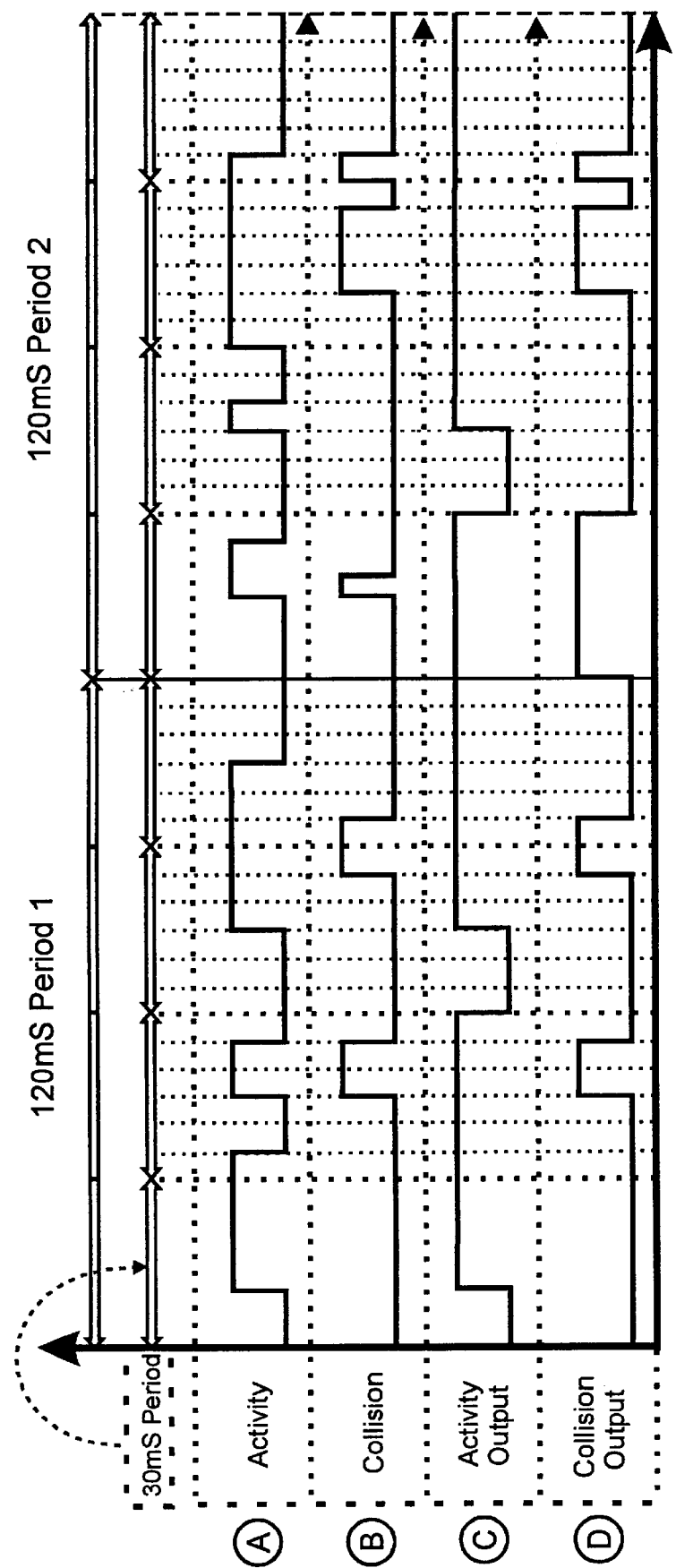
FIG. 3 is a schematic diagram illustrating a preferred implementation of the described embodiment.

FIG. 3 is a timing diagram illustrating the operation of a network and corresponding operation of a ter preferred embodiment of the present invention. As in FIG. 2, FIG. 3a illustrates the activity on the network of FIG. 1 and FIG. 3b illustrates the occurrence of collisions on the network. It will be appreciated that the activity and collision pattern represented by FIGS. 3a and 3b is identical to that represented by FIGS. 2a and 2b. In this embodiment however the indication of activity and the indication of collision may be given quite independent from each other and therefore FIGS. 3c and 3d respectively represent the activity and collision indication given in this embodiment.

Again in this embodiment, time is considered divided into sequential time periods and sub-periods in a corresponding manner to FIG. 2 and details of this are not described again. Also, this embodiment will be described in terms of green and yellow indicators although once again this is not limiting.

As with the embodiment described with relating to FIG. 2, when collision is detected in the network the yellow indicator is activated whenever a collision is occurring and also during the whole of the first sub-period of any given period if collision occurred any time during the preceding period. This output, illustrated in FIG. 3d, is therefore identical to the yellow indication given in the embodiment illustrated by FIG. 2.

With regard to the activity display, the indication is broadly similar to that described above in that firstly when activity is detected the green indicator is activated and this activation is continued until the end of the sub-period in which the activity occurred, even if the activity ceases before the end of the sub-period Once again, this can be seen in the fourth sub-period of period 1 and the second sub-period of period 2.

In this embodiment however the green indication is also given during the whole of the first sub-period of any given period if activity occurred any time during the preceding period. This can be seen in the first sub-period of period 2 in FIG. 3 where the activity output illustrated in FIG. 3c is given throughout this sub-period as a result of activity occurring during period 1.

This further embodiment is particularly useful in the context of networks where there is very low levels of activity. In such a context, the periods for which the green indication is given might be so short and infrequent that no use for visual indication is given. Therefore, in this embodiment illustrated in FIG. 3 it is the case that, whenever there is activity, the activity indication is given for at least a predetermined proportion of the time ensuring that a useful visual indication is given.

Referring to FIG. 2 it can be seen that, for the level of activity represented by FIG. 2a, the green indication is given for at least some of the time for periods of the order of 30 ms. These indications are therefore visually perceptible by the human eye and a useful indication is given. It will seen however that if the activity level falls to a very low level then, in the operation of the embodiment illustrated by FIG. 2, the green indications may be given for very short periods of time and very infrequently resulting in now perceptible indication being given that activity is occurring on the network As discussed above, this is overcome by operation according to FIG. 3 where, in the event that any activity is occurring, an indication of this is given for at least a predetermined proportion of the time and the indicator is on for at least 30 ms and is therefore perceptible to the human eye.

In high activity situations, the green indication would be given in accordance with the operation under FIG. 2 for a significant proportion of the time and therefore altering the operation to be according to FIG. 3 would not significantly increase the time for which the green indication is given. However, it is further envisaged that the invention could be implemented so that it switches dynamically between operating according to the timing of FIG. 2 and the timing of FIG. 3 according to the activity level on the networks.

This invention and in particular the preferred embodiments provide considerable advantages in terms of ease of monitoring the activity of fast computer networks while still remaining relatively simple to implement, as the activity and collision inputs to the display scheme are derived from the network in a known fashion.

Figure 4:
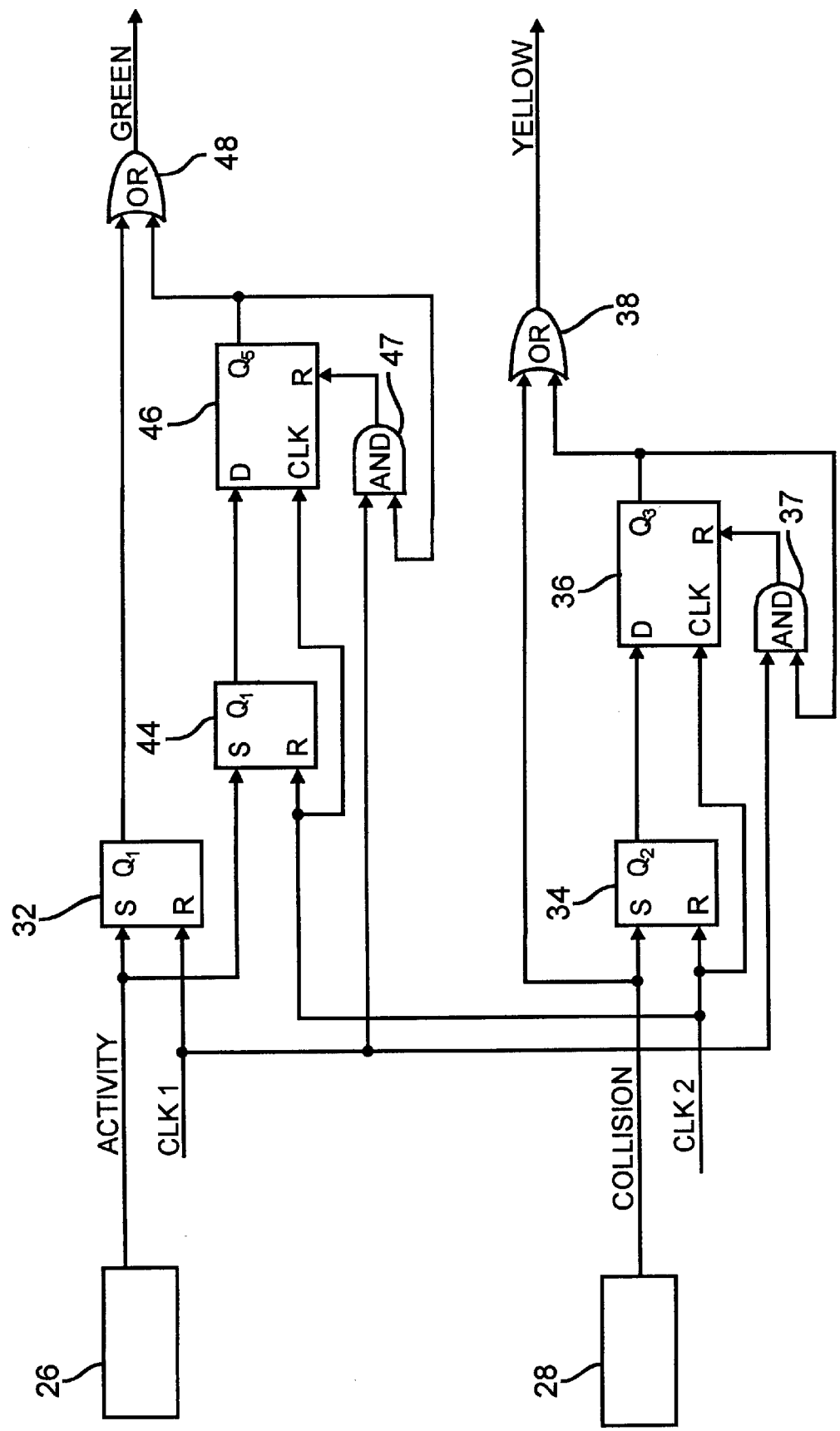
FIG. 4 is a schematic diagram illustrating one possible logic arrangement which may be used to implement the timings of one embodiment of the invention.

FIG. 4 illustrates one possible logic arrangement which may be used to implement the timings described above. In particular, the logic comprises first and second RS latches 32, 34, 44, D-type flip-flops 36, 46, AND gates 37, 47 and OR gates 38, 48. The logic takes as inputs the activity collision indications corresponding to those illustrated in FIGS. 2 and 3. These signals are derived from activity detection means 26 and collision detection means 28. Activity detection means 26 may be implemented simply as the carrier sense mechanism known in the device 10 and the collision detection means 28 may be the known collision detect mechanism also well known in hubs.

The outputs from the logic illustrated in FIG. 4 indicate, in the terms of the description above, when a green and a yellow indication should be given. As mentioned above, a single indicator may be used to provide these indications in which case the outputs from FIG. 4 are combined to achieve this. Alternatively, the two outputs from FIG. 4 may be used to drive to separate visual indicators. Once again, it is emphasised that the colours green and yellow are merely by way of example and any appropriate pair of colours may be used, or indeed when two visual indicators are used to indicate activity and collision these may be the same colour.

Additionally, in the logic of FIG. 4, there are provided two clock signals, CLK1 and CLK2. CLK1 defines the sub-periods mentioned in FIGS. 2 and 3 and, in the preferred embodiment, CLK1 has a period of 30 ms. RS latch 32 therefore functions as described above, to extend the indication of activity to the end of any sub-period within which activity occurs. In particular, as can be seen from FIG. 4, any activity indication which is received sets latch 32 such that output Q1 is high. This situation continues even if the activity ceases until the next rising edge of CLK1 which resets latch 32.

CLK2 defines the periods discussed above and in particular a coincidence of rising edges in CLK1 and CLK2 defines the beginning of a period. Latch 34 operates in a similar fashion to latch 32 in that it latches the occurrence of any collision during a period. That is, if any collision occurs during a period output Q2 goes high. At the beginning of the next period, CLK2 clocks D-type flip-flop 36 such that, at the beginning of the period, whatever value is currently applied to input D, that value is latched to output Q3. Also the rising edge of CLK2 resets latch 34 in preparation for latching any collisions which occur during the next period.

Output Q3 is therefore high at the beginning of a period if any collision occurs during the preceding period. This output is applied via OR gate 38 as the yellow output to indicate the occurrence of a collision. As described above in relation to FIG. 2, this indication is to last only for the first sub-period and therefore the next rising edge of CLK1 which defines the end of the first sub-period is used, via AND gate 37, to reset D-type flip-flop 36 such that the output Q3 goes low. In addition to the yellow output being high whenever output Q3 is high, it is seen from FIG. 2 that this output is also given whenever a collision occurs and this is achieved by the application of the collision input also to OR gate 38.

The output signal "YELLOW" and the signal Q1 in FIG. 4 therefore may be used to implement the timings illustrated in FIG. 2 and discussed above.

As described above, in FIG. 3 the activity indication is additionally given for the whole of the first sub-period. This is provided in FIG. 4 by AS latch 44, D-type flip-flops 46, AND gate 47 and OR gate 48. These are responsive to the activity input in a manner corresponding to the response latch 34, flip-flop 36, AND gate 37 and OR gate 38 to the collision input as described in detail above, and therefore provide the timing function illustrated in FIG. 3.

It will be seen therefore that FIG. 4 provides a logic arrangement which provides the function described above in relation to FIGS. 2 and 3, but many other logic arrangements are also available.

This invention therefore provides a relatively simply implemented way to provide a visually useful output of the collision and activity status of a high speed network which, although not strictly in proportion to the activity and collision status, does provide some quantitative measure of these parameters.

What is claimed is:

1. A method of providing a visual indication of the occurrence of activity and collision in a computer network, the method comprising:
   sensing the occurrence of activity in said network;
   sensing the occurrence of collision in said network;
   providing a first visual indication for at least a predetermined proportion of time when the occurrence of collision is sensed;
   providing a second visual indication during occurrence of activity;
   dividing time into sequential periods, and each period into a plurality of sub-periods; and
   providing said first visual indication throughout a predetermined sub-period of one of said periods if it has been sensed that collision occurred during the immediately preceding period.

2. A method according to claim 1 in which said first visual indication is given throughout the first sub-period of said one of said periods.

3. A method according to claim 1 in which each of said sub-periods is 30 ms long.

4. A method according to claim 1 in which said second visual indication is provided until the end of the sub-period in which activity occurs even in the event that the activity ceases before the end of said sub-period.

5. A method according to claim 1 comprising providing said second visual indication throughout a predetermined sub-period of one of said periods if it has been sensed that activity occurred during the immediately preceding period.

6. The method of claim 1, wherein
   said second visual indication is provided during the occurrence of activity when said first indication is not being provided.

7. A method according to claim 1 in which said second visual indication is provided throughout the occurrence of activity.

8. A method according to claim 1 comprising providing said second visual indication for at least a predetermined proportion of time when the occurrence of activity is sensed.

9. A method according to claim 1 further comprising providing first and second visual indication devices for providing said first and second visual indications respectively.

10. A method of providing a visual indication of the occurrence of activity and collision in a computer network, the method comprising:
    sensing the occurrence of activity in said network;
    sensing the occurrence of collision in said network;
    providing a first visual indication for at least a predetermined proportion of time when the occurrence of collision is sensed;
    providing a second visual indication during occurrence of activity; and in which each provision of said second visual indication is continued until a predetermined time even if activity in the network ceases before that time.

11. A method of providing a visual indication of the occurrence of activity and collision in a computer network, the method comprising:
    sensing the occurrence of activity in said network;
    sensing the occurrence of collision in said network;
    providing a first visual indication for at least a predetermined proportion of time when the occurrence of collision is sensed;
    providing a second visual indication during occurrence of activity;
    providing a visual indication device operable in first and second modes;
    operating said visual indication device in said first mode to provide said first visual indication; and operating said visual indication device in said second mode to provide said second visual indication.

12. Network status indication apparatus comprising:
   first sensing means arranged to sense collision in a network;
   second sensing means arranged to sense activity in said network;
   visual indication means arranged to provide a first visual indication for at least a predetermined proportion of time when said first sensing means senses collision in said network and to provide a second visual indication during time when said second sensing means senses activity in said network;
   timing means defining sequential periods of time, each period having a plurality of sub-periods; and wherein
   said visual indication means provides said first visual indication throughout a predetermined sub-period of one of said periods if said first sensing means sensed that collision occurred during the immediately preceding period.

13. Apparatus according to claim 12 in which said predetermined sub-period is the first sub-period of said one of said periods.

14. Apparatus according to claim 12 in which each of said sub-periods is 30 ms long.

15. Apparatus according to claim 12 in which said visual indication means provides said second visual indication until the end of the sub-period in which activity occurs even in the event that the activity ceases before the end of said sub-period.

16. Apparatus according to claim 12 in which said visual indication means provides said second visual indication throughout a predetermined sub-period of one of said periods if said second sensing means sensed that activity occurred during the immediately preceding period.

17. The network status indication apparatus of claim 12, wherein
   said visual indication means provides said second visual indication during the occurrence of activity when said first visual indication is not being provided.

18. Apparatus according to claim 12 in which said visual indication means provides said second visual indication throughout the occurrence of activity.

19. Apparatus according to claim 12 in which said visual indication means is arranged to provide said second visual indication for at least a predetermined proportion of time when said second sensing means senses activity in said network.

20. Apparatus according to claim 12 in which said visual indication means comprises first and second visual indication devices for providing said first and second visual indications respectively.

21. Network status indication apparatus comprising:
   first sensing means arranged to sense collision in a network;
   second sensing means arranged to sense activity in said network;
   visual indication means arranged to provide a first visual indication for at least a predetermined proportion of time when said first sensing means senses collision in said network and to provide a second visual indication during time when said second sensing means senses activity in said network; in which
   said visual indication means continues each provision of said second visual indication until a predetermined time even if activity in the network ceases before that time.

22. Network status indication apparatus comprising:
   first sensing means arranged to sense collision in a network;
   second sensing means arranged to sense activity in said network;
   visual indication means arranged to provide a first visual indication for at least a predetermined proportion of time when said first sensing means senses collision in said network and to provide a second visual indication during time when said second sensing means senses activity in said network; in which
   said visual indication means comprises a visual indication device operable in first and second modes;
   means for operating said visual indication device in said first mode to provide said first visual indication; and
   means for operating said visual indication device in said second mode to provide said second visual indication.

23. Network communications device for use in a computer network comprising network status indication apparatus comprising:
   first sensing means arranged to sense collision in said network;
   second sensing means arranged to sense activity in said network;
   visual indication means arranged to provide a first visual indication for at least a predetermined proportion of time when said first sensing means senses collision in said network and to provide a second visual indication during time when said second sensing means senses activity in said network;
   timing means defining sequential periods of time, each period having a plurality of sub-periods; and wherein
   said visual indication means provides said first visual indication throughout a predetermined sub-period of one of said periods if said first sensing means sensed that collision occurred during the immediately preceding period.

24. A network status indication system for coupling to a network comprising:
   a first sensor coupled to sense a collision in the network;
   a second sensor coupled to sense activity in the network;
   a visual indicator, coupled in communications with the first sensor and the second sensor, and arranged to generate a first visual indication for at least a predetermined proportion of time when the first sensor senses the collision in the network and to generate a second visual indication during a time when the second sensor senses activity in the network;
   a timer defining sequential periods of time, each period having a plurality of sub-periods; and wherein
   the visual indicator to generate the first visual indication throughout a predetermined sub-period of one of the periods if the first sensor sensed that a previous collision occurred during the immediately preceding period.

25. The network status indication system of claim 24 further comprising a router.

26. The network status indication system of claim 24 further comprising a hub capable of communicating with at least one network device at 100 MB hub and wherein the first sensor and second sensor are capable of sensing collisions in 100 MB communications.

27. The network status indication system of claim 24 wherein the visual indicator includes an LED.

* * * * *